United States Patent
Seidita

(10) Patent No.: US 6,616,015 B2
(45) Date of Patent: Sep. 9, 2003

(54) MANIFOLD STRUCTURE FOR PRESSURE MOLDING

(75) Inventor: Thomas M. Seidita, Mechanicsville, VA (US)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 0 days.

(21) Appl. No.: 09/977,825

(22) Filed: Oct. 15, 2001

(65) Prior Publication Data

US 2002/0074351 A1 Jun. 20, 2002

Related U.S. Application Data

(63) Continuation-in-part of application No. 09/492,481, filed on Jan. 27, 2000.

(51) Int. Cl.$^7$ .................................................. B67D 5/62
(52) U.S. Cl. ...................... 222/146.5; 222/509
(58) Field of Search ............................ 222/146.5, 509, 222/518; 239/128, 132, 135

(56) References Cited

U.S. PATENT DOCUMENTS

| | | | |
|---|---|---|---|
| 4,588,367 A | 5/1986 | Schad | 425/549 |
| 4,592,491 A | 6/1986 | Chollet | |
| 4,790,458 A | 12/1988 | Moore | |
| 5,747,102 A | 5/1998 | Smith et al. | |

Primary Examiner—Joseph A. Kaufman
(74) Attorney, Agent, or Firm—Knoble & Yoshida, LLC

(57) ABSTRACT

A system for pressure molding plastic material includes a source of hot flowable plastic material and a manifold for receiving hot flowable plastic material from the source and for transporting the hot flowable plastic material to a nozzle that is disposed within a nozzle cavity. A heater is provided to heat the nozzle and is positioned outside of, but close to, the nozzle cavity and includes at least one electrical supply wire. A shut-off seal is positioned within the nozzle cavity to seal the nozzle with respect to the wall defining the shut-off cavity. In addition, a secondary seal is most advantageously positioned between the shut-off seal and the heater for ensuring that any hot flowable plastic material that might leak through the shut-off seal does not come into contact with the electrical supply wire. This has been found to increase the reliability and operating life of conventional pressure molding systems.

16 Claims, 6 Drawing Sheets

MANIFOLD STRUCTURE FOR PRESSURE MOLDING

This is a continuation in part of Ser. No. 09/492,481, filed Jan. 27, 2000, the disclosure of which is hereby incorporated as if set forth fully herein.

BACKGROUND OF THE INVENTION

1. Field of the Invention

This invention relates to pressure molding systems, which are used, for example, to mold articles such as closures for containers. More specifically, this invention relates to improvements in pressure molding systems that increase their operating life and reliability.

2. Description of the Related Technology

Pressure molding systems typically include a source or sources of hot flowable plastic material, a number of mold cavities, and at least one distribution manifold system or "hot runner" for supplying the hot flowable plastic material to the mold cavities. This is done via nozzles under conditions of controlled pressure and temperature, and with substantially uniform flow rates, thereby creating uniform quality molded products in each of the mold cavities.

FIGS. 1 and 2 depict one commercially available pressure molding system, which is described in U.S. Pat. No. 4,588,367 to Schad. As may be seen in FIGS. 1 and 2, a floating manifold 11 is disposed between thermal expansion support elements 12, 13 that are received in mating wells 14, 16 formed in a manifold plate 17 and a backing plate 18, respectively. A pressure molding system 19 advances plastic material under high pressure through a conduit 21 into a main manifold channel 22 and thence to nozzles, 23 and 24, which, in turn, direct plastic into mold, cavities 26 and 27 formed in platens 28 and 29.

As shown in FIG. 2, the thermal expansion element 12 includes a tubular member 32 that surrounds and is spaced from a nozzle 24. One end of the tubular member 32 is connected to the body of the expansion element by a bridge 33, and the other end terminates in a peripheral flange 34, which fits within the sidewall 36 of well 14. On the opposite side of manifold 11, well 16 formed in abutment 18 receives a support element 13. Element 13, independent of a nozzle, is seated in the bottom of well 16 and its head 43 contacts one side of floating manifold 11 as does head 44 of combined nozzle 24 and thermal expansion support element 12 upon the opposite side of the manifold.

As temperature builds up during the course of machine start-up, the manifold 11 conducts heat to nozzle 24. In addition, the nozzle 24 is heated by electric resistance heaters 50 that are supplied electricity by a plurality of electric wires. The manifold 11 tends to expand as the temperature increases and the tubular members 32–32a of support elements 12 and 13 also expand creating compressive forces to effect a seal at the interface of each nozzle and its mating manifold orifice.

As may be seen in FIG. 3, the nozzle 23 is disposed within a nozzle cavity 52 that is defined in the mold platen 28. In operation, nozzle cavity 52 fills with hot flowable plastic material 58, which is forced out of the gate 56 into the mold cavity 26 as it is displaced by additional hot flowable plastic material that is introduced from the nozzle 23. A shut-off seal 54 is provided to seal or shut off the nozzle cavity 52 from the space in which, among other things, the electric resistance heater is disposed. Shut-off seal 54 is typically made of a metallic material, such as steel, and is sized so as to press tightly against the wall 60 defining a lower end of the nozzle cavity 52.

Unfortunately, in practice it has been determined that the shut-off seal 54 is insufficiently effective in containing the hot flowable plastic material within the nozzle cavity 52 during operation. This may be due to a number of factors, such as damage that can occur to the seals 54 and the walls 60 during routine maintenance and mold changeovers. Regardless of the reasons, the result of leakage from the seals 54 is that plastic material ends up in unwanted areas of the manifold structure, and in particular in the area of the electric resistance heaters 50. This has been found to disable individual heaters 50, in particular by fouling the electrical wires, which results in the entire mold freezing up and becoming disabled.

A need exists for an improved system and method for increasing the reliability and operating life of pressure molding systems of the type that have been described above in reference to FIGS. 1–3.

SUMMARY OF THE INVENTION

Accordingly, it is an object of the invention to provide an improved system and method for increasing the reliability and operating life of pressure molding systems of the type that have been described above in reference to FIGS. 1–3.

In order to achieve the above and other objects of the invention, a system for pressure molding plastic material includes, according to a first aspect of the invention, a source of hot flowable plastic material; a manifold for receiving hot flowable plastic material from the source and for transporting the hot flowable plastic material; a nozzle cavity that is defined by at least one wall; a nozzle disposed within the nozzle cavity, the nozzle being operatively in communication with the manifold for receiving hot flowable plastic material therefrom; a heater for heating the nozzle, the heater being positioned outside of, but close to, the nozzle cavity and having at least one electrical supply wire; a shut-off seal positioned within the nozzle cavity to seal the nozzle with respect to the wall defining the shut-off cavity; and a secondary seal positioned between the shut-off seal and the electrical supply wire for ensuring that any hot flowable plastic material that might leak through the shut-off seal does not come into contact with the heater.

According to a second aspect of the invention, a nozzle assembly for pressure molding plastic material, includes a nozzle cavity that is defined by at least one wall; a nozzle disposed within the nozzle cavity, the nozzle being constructed and arranged to receive hot flowable plastic material from a source thereof; a heater for heating the nozzle, the heater being positioned outside of, but close to, the nozzle cavity and including an electrical supply wire; a shut-off seal positioned within the nozzle cavity to seal the nozzle with respect to the wall defining the shut-off cavity; and a secondary seal positioned between the shut-off seal and the heater for ensuring that any hot flowable plastic material that might leak through the shut-off seal does not come into contact with the electrical supply wire.

According to a third aspect of the invention, a method of retrofitting a pressure molding system of the type that includes a nozzle cavity having a nozzle disposed therein that is constructed and arranged to receive hot flowable plastic material from a source thereof, a heater for heating the nozzle that is positioned outside of, but close to, the nozzle cavity and includes an electrical supply wire, and a shut-off seal positioned within the nozzle cavity to seal the nozzle with respect to the wall defining the shut-off cavity, includes steps of gaining access to an area within the pressure molding system that is between the shut-off seal and the heater; and installing a secondary seal in the area between the shut-off seal and the heater to ensure that any hot flowable plastic material that might leak through the shut-off seal does not come into contact with the electrical supply wire.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 2:
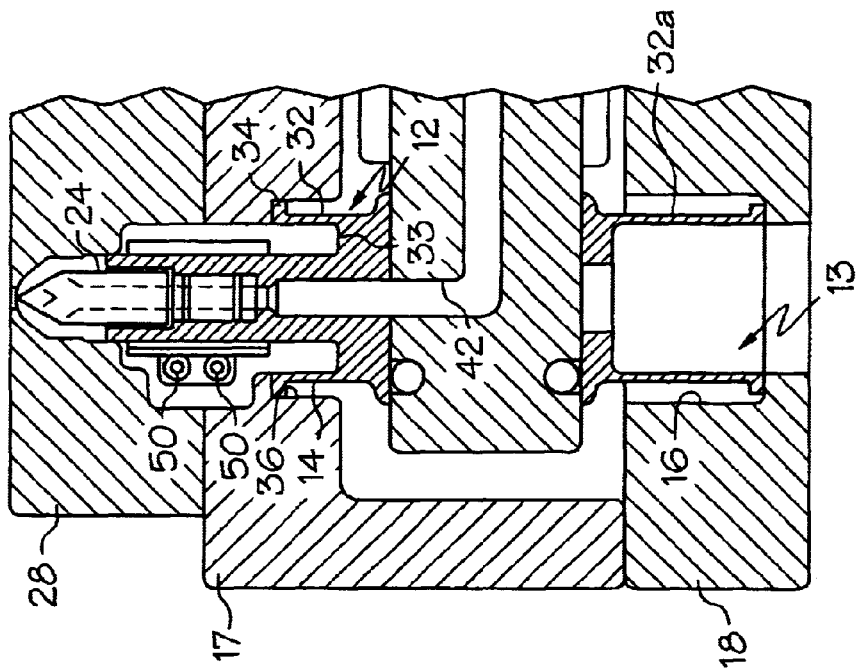
FIG. 2 is a cross-sectional view depicting another aspect of the system shown in FIG. 1.
Figure 1:
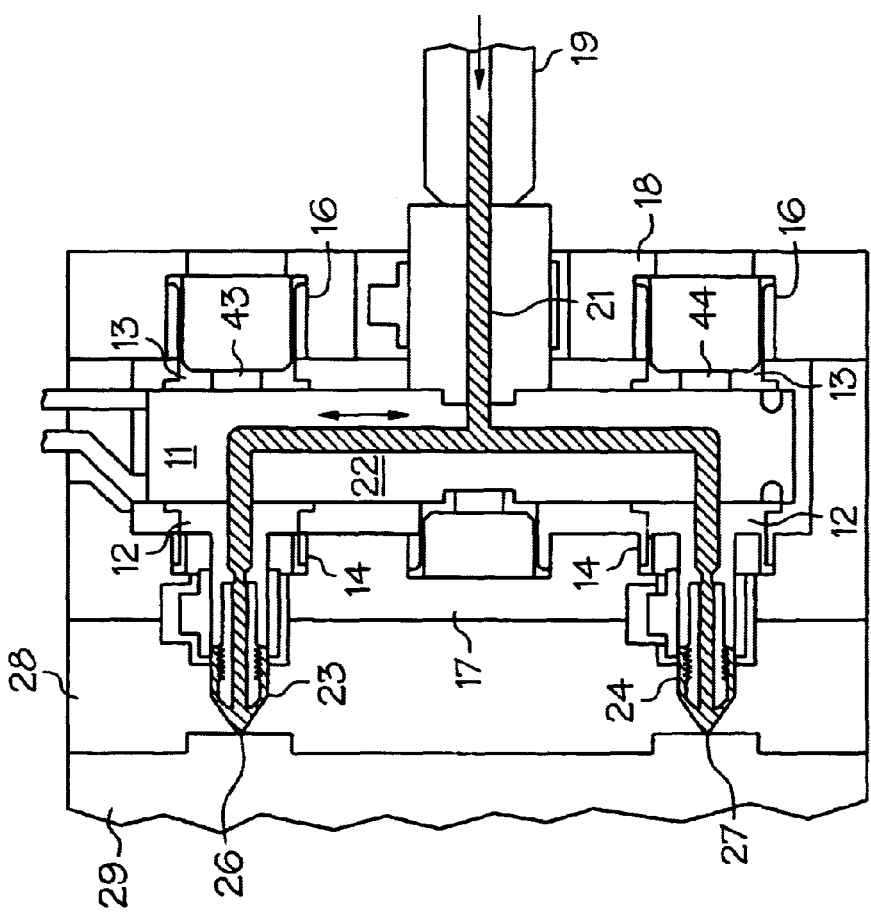
FIG. 1 is a cross-sectional view depicting a conventional pressure molding system.
Figure 3:
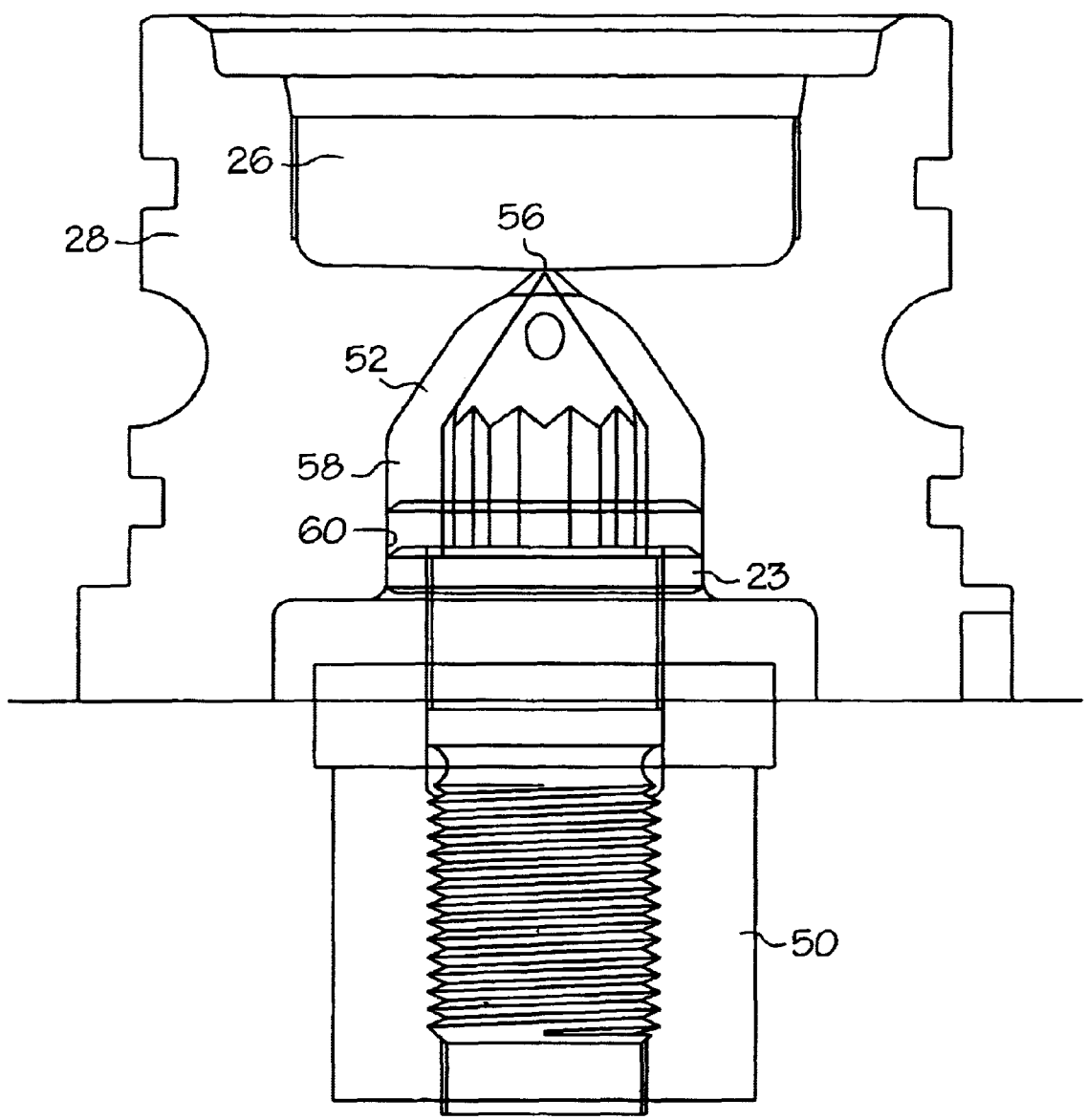
FIG. 3 is a cross-sectional view depicting yet another aspect of the system shown in FIG. 1.
Figure 4:
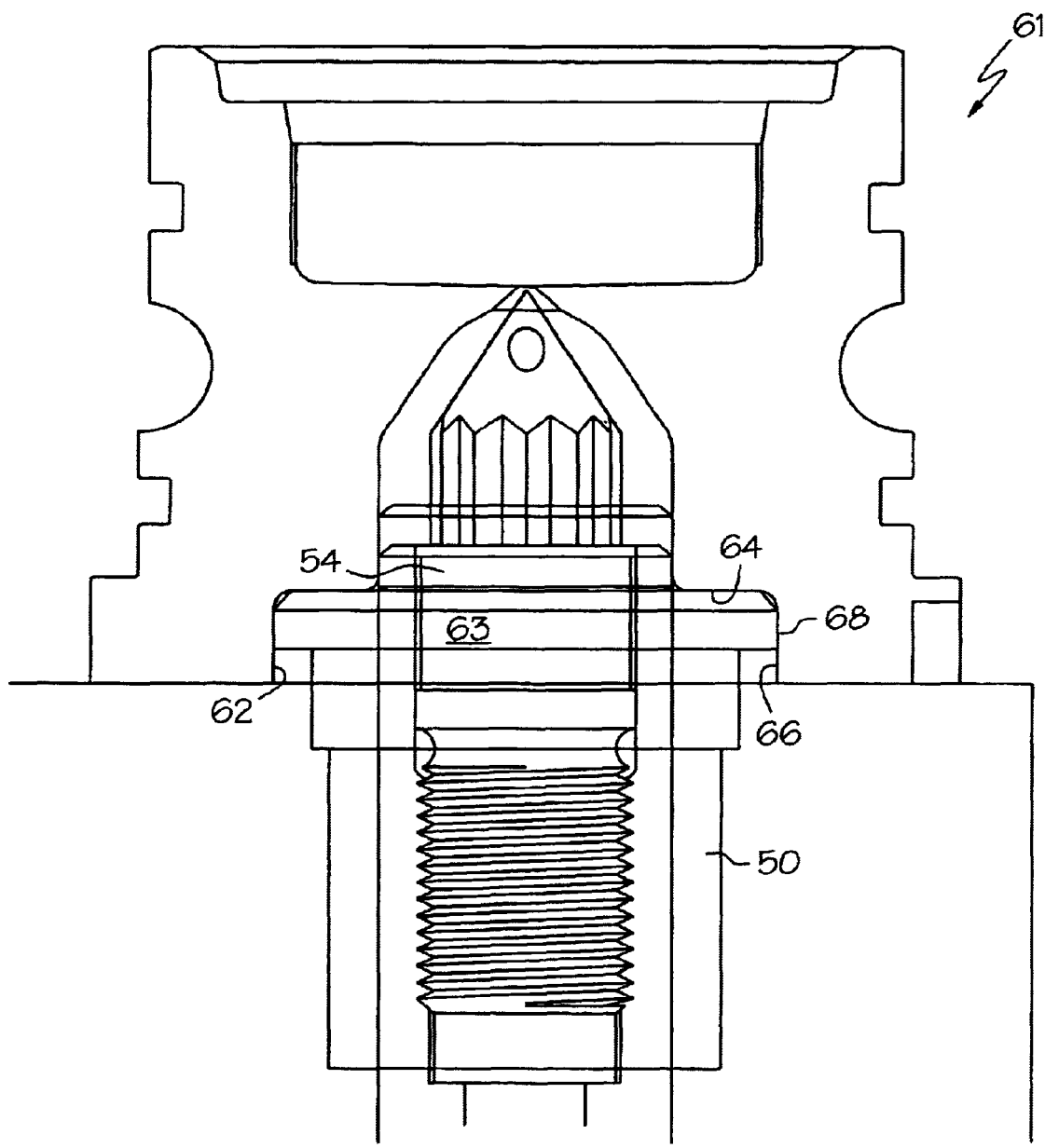
FIG. 4 is a cross-sectional view depicting a pressure molding system that is constructed according to a preferred embodiment of the invention.
Figure 5:
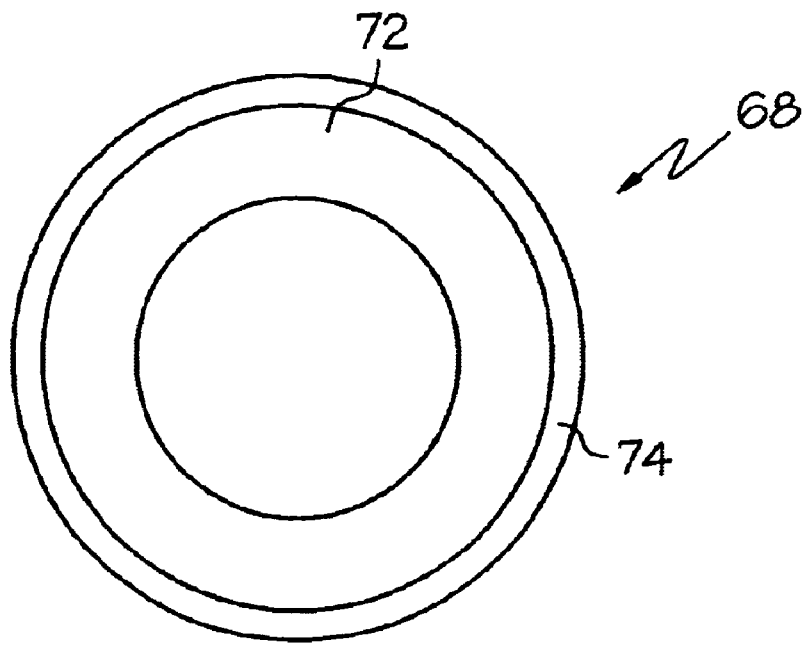
FIG. 5 is a top plan view of one component of the system that is depicted in FIG. 4.
Figure 6:
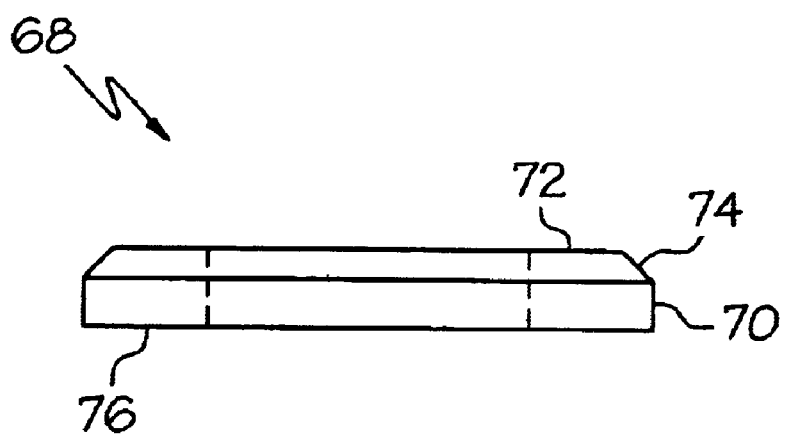
FIG. 6 is a side elevational view of the component that is depicted in FIG. 5.

Referring now to the drawings, wherein like reference numerals designate corresponding structure throughout the views, and referring in particular to FIG. 4, a system 61 that is constructed according to a preferred embodiment of the invention is identical to the system discussed above in reference to FIGS. 1–3 except as described below. As may be seen in FIG. 4, the system 61 includes a shut off seal 54 that is positioned in the manner that is described above with reference to FIG. 3. The wall 60 that defines the cavity 52 is continuous with a counterbore 62 that includes a bottom portion 64 that is positioned horizontally as shown in FIG. 4, and a circumferential wall 66, as may also be seen in FIG. 4. According to one particularly advantageous feature of the invention, a secondary seal 68 is positioned within a mold cavity 63 that is beneath the nozzle cavity 52 and separated from the nozzle cavity 52 by the shut off seal 54. Secondary seal 68 is thereby positioned between the shut off seal 54 and the electric resistance heater 50 and its electrical supply wires. As may be seen in FIG. 4, secondary seal 68 is positioned within the counterbore 62 so that a top surface 72 thereof, as shown in FIGS. 5 and 6, is in contact with the bottom surface 64 of the counterbore 62, and so that a circumferential outer edge 70 of the secondary seal 68 is in contact with the circumferential wall 66 of the counterbore 62. Referring briefly to FIGS. 5 and 6, it will be seen that secondary seal 68 further includes a bottom surface 76 and a frustoconical portion that is defined by a chamfered edge 74 at the interface of the circumferential outer edge 70 and top surface 72. The purpose of chamfer 74 is to avoid interference with the radiused transition between the bottom surface 64 and the circumferential wall 66 of the counterbore 62.

Secondary seal 68 could be constructed from any one of a number of materials, but it is preferably fabricated from a high temperature plastic that is capable of withstanding the operating temperatures within the system 61 without a significant change of properties or degradation. In the most preferred embodiment, secondary seal 68 is fabricated from Polyether-ether-ketone.

The purpose of the secondary seal 68 is to ensure that the hot flowable plastic material that is in the cavity 52 during operation will be prevented from reaching sensitive internal components of the apparatus 61, and in particular the electric resistance heater 50 and its wires, in the event that leakage occurs at the shut off seal 54.

Another aspect of the invention involves a process of retrofitting existing systems to incorporate the secondary seal 68. According to this aspect of the invention, access is first gained to the area of the system 61 that is between the shut off seal 54 and the electric resistance heater 50. The secondary seal is then inserted into the position that is shown in FIG. 4. The system 61 is then reassembled as necessary and is then placed into operation. This process of retrofitting existing systems according to the invention also incorporates a process of retrofitting systems that are consistent with the second embodiment of the invention, which is discussed in greater detail below.

Figure 7:
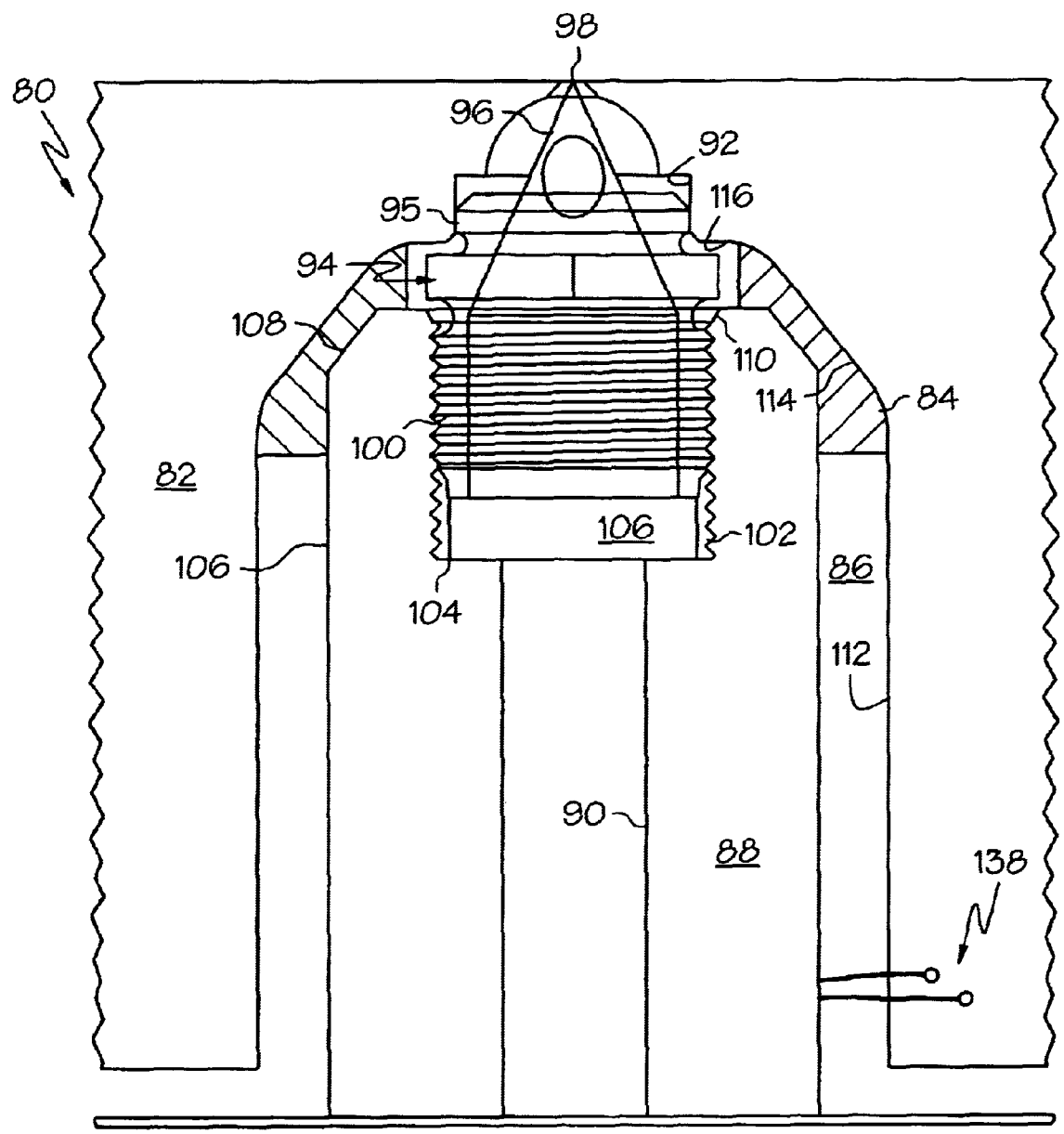
FIG. 7 is a fragmentary cross-sectional view depicting a system that is constructed according to a second embodiment of the invention.

A system 80 that is constructed according to a second aspect of the invention is depicted in FIG. 7. System 80 includes a mold assembly 82 having an inner wall 84 that defines a mold cavity 86 in which a nozzle heater 88 is positioned. A melt channel 90 is defined within the nozzle heater 88 which includes a counterbore 92 in which a transfer seal element 94 may be positioned. Transfer seal element 94 includes a flange 95 having a smooth cylindrical metallic surface that forms a shut off seal with the inner wall of bore 92 during operation. System 80 further includes a nozzle 96 that terminates in a gate area 98 as is conventional in this area of technology. Nozzle 96 includes a lower flange portion 106 that is supported by a shoulder 104 that is defined within the nozzle heater 88. As may be seen in FIG. 7, transfer seal element 94 includes external threads 100 that mate with internal threads 102 that are defined within the nozzle heater 88. This permits the transfer seal element to be screwed downwardly into the nozzle heater 88 so as to bear on the flange portion 106 of the nozzle 96 so as to secure the nozzle 96 to the nozzle heater 88.

As may further be seen in FIG. 7, nozzle heater 88 is generally cylindrical in shape, having a cylindrical outer wall 106, but it is chamfered at its upper end so as to define a frustoconical upper surface 108 between the circumferential outer wall 106 and a top surface 110 of the nozzle heater 88. The inner wall 84 of the mold cavity 86 similarly includes a cylindrical inner wall portion 112 as well as a frustoconical upper inner wall portion 114 and a top or horizontal wall portion 116.

Figure 8:
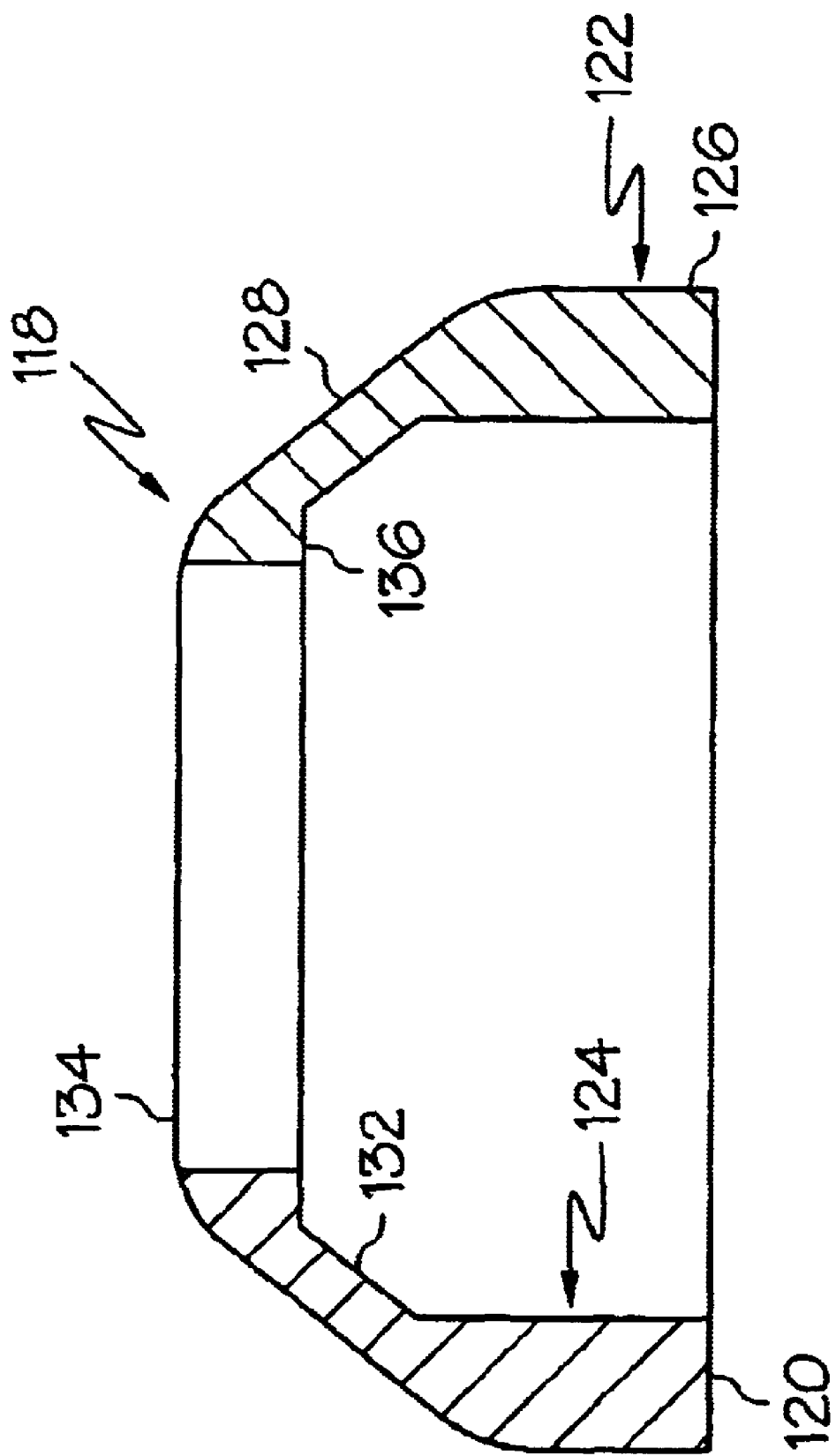
FIG. 8 is a cross-sectional view of one component of the system that is depicted in FIG. 7.

In order to prevent liquid plastic material that escapes from the shut off seal from reaching the electrical supply wires 138 that are positioned lower in the mold cavity 86, this embodiment of the invention provides a secondary seal 118 that is shaped to fully surround the frustoconical upper portion of the nozzle heater 88 and have the same time form an effective seal with the generally frustoconical inner wall 84 of the mold cavity 86. Secondary seal 118 is preferably formed of the same material discussed above with reference to the first embodiment of the invention. Looking now to FIG. 8, it will be seen that the secondary seal 118 includes a flat bottom surface 120, and outer surface 122 and an inner surface 124. Outer surface 122 includes a cylindrical outer wall portion 126 that is sized and shaped to form a seal with a portion of the cylindrical portion 112 of the inner wall 84 of the mold cavity 86. Outer surface 122 further includes a frustoconical portion 128 that is sized and shaped to seal against the frustoconical inner wall portion 114 of the inner wall 84. There surface 124 includes a first cylindrical inner wall portion 130 that is sized and shaped to seal against the cylindrical outer wall portion 106 of the nozzle heater 88, and a frustoconical inner surface 132 that is similarly sized and shaped to seal against the frustoconical chamfered upper surface 108 of the nozzle heater 88. There surface 124 further includes an upper cylindrical portion 134 and a horizontal portion 136 that is sized and shaped to seal against the top surface 110 of the nozzle heater 88.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for pressure molding plastic material, comprising:
    a source of hot flowable plastic material;
    a manifold for receiving hot flowable plastic material from said source and for transporting the hot flowable plastic material;
    a nozzle cavity that is defined by at least one wall;
    a nozzle disposed within said nozzle cavity, said nozzle being operatively in communication with said manifold for receiving hot flowable plastic material therefrom;
    a heater for heating said nozzle, said heater being positioned outside of said nozzle cavity and having at least one electrical supply wire;
    a shut-off seal positioned within said nozzle cavity to seal said nozzle with respect to said wall defining said shut-off cavity; and
    a secondary seal positioned between said shut-off seal and said heater for ensuring that any hot flowable plastic material that might leak through said shut-off seal does not come into contact with said electrical supply wire.

2. A system according to claim 1, wherein said secondary seal is fabricated from a material comprising a high temperature plastic.

3. A system according to claim 2, wherein said secondary seal is fabricated from a material comprising Polyether-ether-ketone.

4. A system according to claim 1, wherein said secondary seal is positioned within a mold cavity that is separated from said nozzle cavity by said shut off seal.

5. A system according to claim 4, wherein said mold cavity is partially defined by a counterbore, and wherein said secondary seal is constructed and arranged to seal against an inner wall of said counterbore.

6. A system according to claim 5, wherein said secondary seal includes an outer surface having a first generally cylindrical portion and a second generally frustoconical portion.

7. A system according to claim 5, wherein said secondary seal includes an inner surface having a first generally cylindrical portion and a second generally frustoconical portion.

8. A system according to claim 7, wherein said inner surface further includes a generally horizontal portion.

9. A nozzle assembly for pressure molding plastic material, comprising:
    a nozzle cavity that is defined by at least one wall;
    a nozzle disposed within said nozzle cavity, said nozzle being constructed and arranged to receive hot flowable plastic material from a source thereof;
    a heater for heating said nozzle, said heater being positioned outside of, but close to, said nozzle cavity and comprising an electrical supply wire;
    a shut-off seal positioned within said nozzle cavity to seal said nozzle with respect to said wall defining said shut-off cavity; and
    a secondary seal positioned between said shut-off seal and said heater for ensuring that any hot flowable plastic material that might leak through said shut-off seal does not come into contact with said electrical supply wire.

10. A nozzle assembly according to claim 9, wherein said secondary seal is fabricated from a material comprising a high temperature plastic.

11. A nozzle assembly according to claim 10, wherein said secondary seal is fabricated from a material comprising Polyether-ether-ketone.

12. A nozzle assembly according to claim 9, wherein said secondary seal is positioned within a mold cavity that is separated from said nozzle cavity by said shut off seal.

13. A nozzle assembly according to claim 12, wherein said mold cavity is partially defined by a counterbore, and wherein said secondary seal is constructed and arranged to seal against an inner wall of said counterbore.

14. A nozzle assembly according to claim 13, wherein said secondary seal includes an outer surface having a first generally cylindrical portion and a second generally frustoconical portion.

15. A nozzle assembly according to claim 13, wherein said secondary seal includes an inner surface having a first generally cylindrical portion and a second generally frustoconical portion.

16. A nozzle assembly according to claim 15, wherein said inner surface further includes a generally horizontal portion.

* * * * *